UNITED STATES PATENT OFFICE.

ANDREW STEVENS, OF NEW YORK, N. Y.

IMPROVEMENT IN WATER-PROOF CORK COMPOSITIONS.

Specification forming part of Letters Patent No. 22,246, dated December 7, 1858.

*To all whom it may concern:*

Be it known that I, ANDREW STEVENS, of the city, county, and State of New York, have invented or discovered a new and useful Composition for Coating and Impregnating and thereby Preserving Cork; and I do hereby declare that the following is a full, clear, and exact description of the same.

This invention or discovery consists in saturating and thereby coating and impregnating granulated cork with a solution which shall, while it renders it less susceptible of absorbing moisture and better adapts it to the purposes of filling the quilted linings of overcoats, jackets, mattresses, and other articles of a like character, and thereby converts them into life-preservers, also impart to them a peculiar and pleasant odor, so injurious and distasteful to bedbugs and other vermin as to entirely keep them from said garments and other articles.

The solution or composition consists of the following ingredients: one gallon of alcohol, one pound of gum-shellac, two ounces of essential oil of cedar; two ounces of essential oil of hemlock; two ounces of essential oil of sassafras. The ingredients being mixed in the proportion stated, the alcohol will first dissolve the shellac, which will cause each particle of granulated cork to be coated with this solution, thus making it impervious and impermeable to water or moisture, and consequently increasing its buoyancy, which thus converts the cork into a highly improved article of manufacture. The essential oils will be diffused through the alcohol and cause the cork to be vermifuge in its nature, thus preventing the attacks of insects of any description, and will moreover impart to it a peculiar odor, which is at once pleasant to human beings and injurious and distasteful to bedbugs and other vermin. From the nature and combination of these essential oils they are better adapted to serve this end than any others, as will be apparent to every pharmaceutist. By this composition the cork is moreover made impervious to water and moisture, and on account of this impregnation, in addition to their value as a life-preserver, the granulated particles of cork are particularly adapted for all kinds of clothing, mattresses, coverlets, or cushions for hospitals, steamers, and all other vessels. In this character it has supereminent advantages, as in the event of disaster the articles lined with the impregnated cork are capable of being formed into rafts and life-preservers, thus furnishing the most reliable and convenient safeguard to human life ever yet offered to the traveling community, as it will sustain the wearer afloat on a body of water for any length of time without inflation, and cannot be injured by being cut or pricked.

Having thus described my invention, I claim and desire to secure by Letters Patent—

As an improved article of manufacture, granulated cork that is covered and impregnated with the composition herein specified.

ANDREW STEVENS.

Witnesses:
W. TUSCH,
W. HAUFF.